United States Patent [19]

Kimura et al.

[11] 4,363,042

[45] Dec. 7, 1982

[54] METHOD AND APPARATUS FOR AUTOMATICALLY TRACKING A MAGNETIC TAPE

[75] Inventors: Kenji Kimura, Tachikawa; Sinichi Saitou, Hachioji; Toyoo Nishiyama, Musashimurayama; Toshikazu Kato, Hachioji; Misao Shimoda, Hamura; Seizo Watanabe, Hachioji; Ken Satoh, Akikawa; Tutomu Shibata, Hachioji, all of Japan

[73] Assignee: Olympus Optical Co., Ltd., Tokyo, Japan

[21] Appl. No.: 133,813

[22] Filed: Mar. 25, 1980

[30] Foreign Application Priority Data

Apr. 2, 1979 [JP] Japan .................................. 54-39511

[51] Int. Cl.³ .......................................... G11B 15/60
[52] U.S. Cl. .................... 360/71; 360/130.21
[58] Field of Search ............. 360/71, 69, 130.2, 130.21

[56] References Cited

U.S. PATENT DOCUMENTS

| | | | |
|---|---|---|---|
| 3,623,042 | 11/1971 | Wohler et al. | 360/71 |
| 3,625,076 | 12/1971 | Yamada | 360/130.21 |
| 3,893,176 | 7/1975 | Jones | 360/71 |
| 3,943,566 | 3/1976 | Brock et al. | 360/71 |

FOREIGN PATENT DOCUMENTS 1858222  9/1962  Fed. Rep. of Germany .
1282701  11/1968  Fed. Rep. of Germany .
52-51913  4/1977  Japan ...................................... 360/71

OTHER PUBLICATIONS

IBM Tech. Disc. Bull., L. H. Everett, Lateral Position Detector for Moving Web, vol. 14, No. 6, Nov. 1971, p. 1834.

Primary Examiner—Alfred H. Eddleman
Attorney, Agent, or Firm—Frishauf, Holtz, Goodman and Woodward

[57] ABSTRACT

In a magnetic tape-automatic tracking method, at least one of the positions of the upper and lower edges of a magnetic tape is detected by an assembly of a tape edge position sensor and light-emitting diode. Any displacement of the running magnetic tape from its standard vertical position is determined from detected data. A generally vertical tape edge position-compensating post which applies a tensile force to the magnetic tape in contact therewith is rotated in a vertical plane by a reversible motor in accordance with the detected extent of the displacement of the running magnetic tape from its standard vertical position. The magnitude of a tensile force applied by the tape edge position-compensating post to the magnetic tape is varied, by the extent of the rotation of the reversible motor. As a result, the magnetic tape is vertically moved in the desired direction to regain its standard vertical position.

10 Claims, 5 Drawing Figures

METHOD AND APPARATUS FOR AUTOMATICALLY TRACKING A MAGNETIC TAPE

BACKGROUND OF THE INVENTION

This invention relates to a method and apparatus for automatically tracking a magnetic tape.

Where, with a magnetic recording-reproduction apparatus using a magnetic tape, for example, a fixed magnetic head type recording-reproduction apparatus, the magnetic tape happens to move vertically during its run, the tracks of the magnetic tape are displaced from the magnetic head gaps (hereinafter referred to as "a track displacement"). This event is known to change the waveform level of a reproduction signal. Variation in the waveform of a reproduction signal gives rise to flickers of fluctuating brightness and consequently resulting in the deterioration of a picture quality. On the other hand, a high density recording is demanded to save the consumption of a magnetic tape. The conventional process of meeting this requirement comprises reducing not only a video track but also a track pitch. However, an attempt to contract the video track has the drawback of causing the track displacement to readily appear in case of the vertical shifting of the running magnetic tape, with a noticeable change in the waveform level of a reproduction signal.

It has hitherto been tried to suppress the occurrence of the track displacement by providing, for example, a guide post fitted with a pair of flanges for a tape-forwarding mechanism. Such prior art process is intended to prevent a magnetic tape from being vertically shifted by causing the upper and lower edges of the magnetic tape to contact the paired flanges of the guide post. As a result, a mechanical stress is applied to the upper and lower edges of the magnetic tape with the resultant frequent damage thereof.

SUMMARY OF THE INVENTION

It is accordingly an object of this invention to provide an automatic tracking method for causing a magnetic tape to run with a standard vertical position always maintained, without damaging the upper and lower edges of the magnetic tape.

To attain the above-mentioned object, an automatic tracking method according to this invention comprises the steps of detecting the vertical position of a magnetic tape by a means for detecting, at a position aligned vertically with the vertical axis of a vertical assembly of horizontally extending head gaps formed in the magnetic head at least one of the positions of the upper and lower edges of the magnetic tape and discovering, if any, the displacement of the magnetic tape from its standard vertical position in accordance with data on the detected vertical position of the magnetic tape. The method further comprises the steps of changing the manner in which a tape edge position-compensating means for applying a tensile force to the magnetic tape in contact with the upper or lower edge of the tape in the sideward direction abuts against the magnetic tape in order to control the magnitude of a tensile force applied by the tape edge position-compensating means to the magnetic tape, thereby enabling the magnetic tape to sustain a standard vertical position.

It is another object of this invention to provide an automatic tracking apparatus of causing a magnetic tape to run with a standard vertical position always maintained, without damaging the upper and lower edges of the magnetic tape. To attain the above-mentioned object, an automatic tracking apparatus according to this invention comprises a tape edge position-compensating means for applying a tensile force to the magnetic tape in contact with the upper or lower edge of the tape in the sideward direction, and a tape edge position-detecting means which detects aligned with the axis of a vertical assembly of horizontally extending head gaps formed in the magnetic head, the position at least one of the positions of the upper and lower edges of the magnetic tape, determines any displacement of the magnetic tape from its standard vertical position in accordance with detected data and changes the mode in which the tape edge position-compensating means is pressed against the magnetic tape in order to control the magnitude of a tensile force applied by the tape edge position-compensating means to the magnetic tape, thereby ensuring the standard vertical position of the magnetic tape during its run.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF THE PREFERRED EMBODIMENT

A method and apparatus for automatically tracking a magnetic tape is now described with reference to the accompanying drawing.

Figure 1:
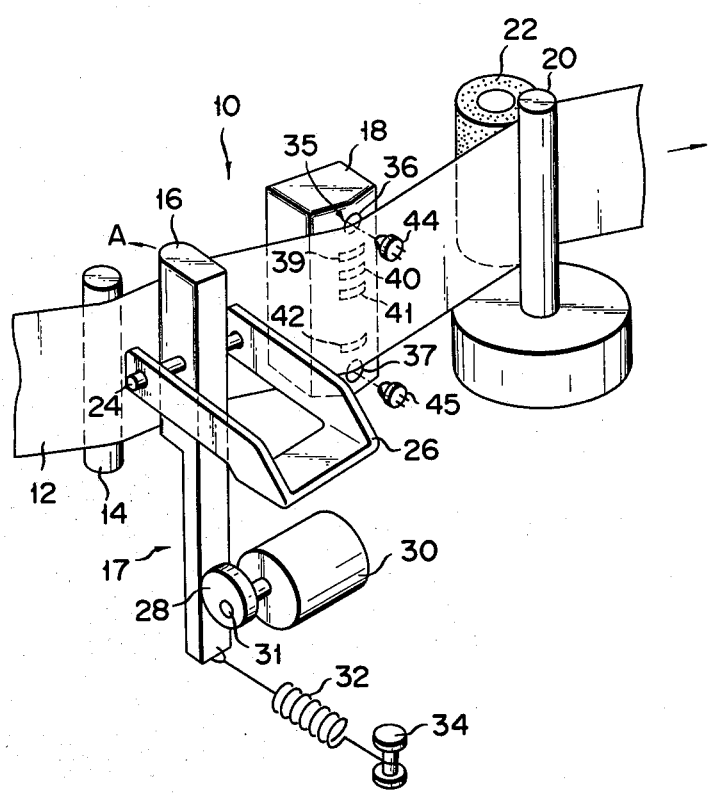
FIG. 1 is a schematic perspective view of an automatic magnetic tape tracking apparatus according to a preferred embodiment of this invention.

FIG. 1 illustrates an automatic magnetic tape tracking apparatus 10 used for an automatic magnetic tape tracking method. A magnetic tape 12 passes by a guide pin 14, tape edge position-compensating post 16 and magnetic head 18, is clamped between a capstan shaft 20 and pinch roller 22, and is made to run by the rotation of the capstan shaft 20. The tape edge position-compensating post 16 partly constitutes a tape edge portion-compensating means 17 and is rotatably fitted to a fixed support 26 by a pivot pin 24. The fixed support 26 is securely mounted on a chassis (not shown). The tape edge position-compensating post 16 is rotated about the pivot pin 24 to be inclined in a vertical plane to partially press the upper or lower edge of the magnetic tape 12 by changing the mode in which the tape edge position-compensating post 16 contacts the magnetic tape. The tape edge position-compensating post 16 normally takes a perpendicular position relative to the magnetic tape 12 inside an imaginary line extending between the guide pin 14 and the magnetic head 18. As a result, the tape edge position-compensating post 16 normally imparts a uniform tensile force to the magnetic tape 12 in the vertical direction or crosswise thereof. When the running magnetic tape 12 maintains its standard vertical position without being vertically displaced therefrom, it is unnecessary to compensate the vertical position of the magnetic tape 12. In such case, the tape edge position-compensating post 16 retains its standard position. Where the tape edge position-compensating post 16 is rotated to change the magnitude of a tensile force applied by the tape edge position-compensating post 16 to the magnetic tape 12, then the magnetic tape 12 tends to be vertically displaced in that direction in which a smaller tensile force is applied to the magnetic tape. When the tape edge position-compensating post 16 is rotated in the direction of an arrow A indicated in FIG. 1 about the pivot pin 24 to be so inclined as to press the upper edge of the magnetic tape 12, then the magnetic tape 12 falls in the direction in which a smaller tensile force is applied. Conversely, when the tape edge position-compensating post 16 is so inclined as to press the lower edge of the magnetic tape 12, then the magnetic tape 12 rises. When the magnetic tape 12 is displaced from its standard vertical position, a tensile force uniformly applied up to this point of time by the tape edge position-compensating post 16 across the magnetic tape 12 gets out of balance, thereby causing the magnetic tape to be vertically moved in such a direction as counterbalances the vertical displacement and enables the magnetic tape to easily regain its standard vertical position.

The tape edge position-compensating post 16 may be rotated by various processes. With the embodiment of FIG. 1, the rotation of the tape edge position-compensating post 16 is controlled by the rotation of a cam 28 fitted to a motor shaft 31 of a reversible D.C. motor 30. In other words, the reversible rotation of the cam 28 by the motor 30 gives rise to a change in the position in which the cam 28 contacts the tape edge position-compensating post 16. Thus, the tape edge position-compensating post 16 is inclined by being rotated about the pivotal pin 24. A tensile coil spring 32 normally urges the tape edge position-compensating post 16 for abutment against the cam 28. One end of the tension coil spring 32 is fitted to a pin 34 mounted on the chassis (not shown).

The rotation of the reversible motor 30 is controlled by electrically detecting the displacement of the running magnetic tape 12 from its standard vertical position. A tape edge position sensor 36, such as a light-receiving transistor, is set in the magnetic head 18 and a light-emitting diode 44 is disposed to face the tape edge position sensor 36 on the opposite side of the magnetic tape 12 to the tape edge position sensor 36. Both tape edge position sensor 36 and light-emitting diode 44 are arranged at the same level as the upper edge of the magnetic tape 12. A further tape edge position sensor 37, such as a light-receiving transistor, is set in the magnetic head 18 and a light-emitting diode 45 is disposed to face the tape edge position sensor 37 on the opposite side of the magnetic tape 12 to the tape edge position sensor 37. Both tape edge position sensor 37 and light-emitting diode 45 are arranged at the same level as the lower edge of the magnetic tape 12. The tape edge position sensors 36, 37 and light-emitting diodes 44, 45 jointly constitute a means 35 for detecting the vertical position of the magnetic tape 12. The upper and lower tape edge position sensors 36, 37 are aligned with the axis of a vertical assembly of horizontally extending head gaps 39, 40, 41, 42 of the multi-head gap type magnetic head 18. The upper light-emitting diode 44 sends forth a light to the upper tape edge position sensor 36 for detecting the upper edge of the magnetic tape 12. The lower light-emitting diode 45 supplies a light to the lower tape edge position sensor 37 for detecting the lower edge of the magnetic tape 12. This arrangement can easily detect the vertical position of the magnetic tape 12.

Figure 2:
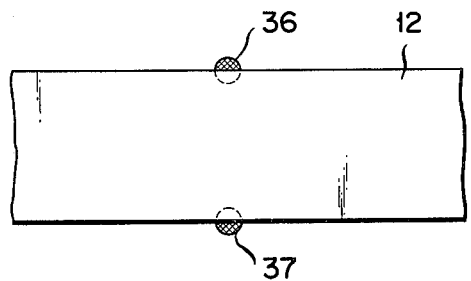
FIG. 2 is a front view of a magnetic tape taking a standard vertical position.

The light-receiving areas of the tape edge position sensors 36, 37 are changed in accordance with the possible vertical displacement of the running magnetic tape 12 from its standard vertical position. Where the running magnetic tape 12 maintains its standard vertical position without being vertically displaced, then the tape edge position sensors 36, 37 are so designed as to indicate the same light-receiving area as shown in hatching in FIG. 2. Where, therefore, the running magnetic tape 12 is displaced from its standard vertical position, then the light-receiving areas of both tape edge position sensors 36, 37 get out of balance, readily indicating the vertical displacement of the running magnetic tape 12. Where the running magnetic tape 12 is displaced upward from its standard vertical position, then the light-receiving area decreases in the upper tape edge position sensor 36 and increases in the lower tape edge position sensor 37.

Figure 3:
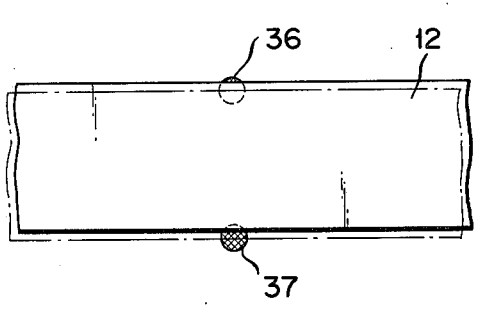
FIG. 3 is a front view of a magnetic tape which is displaced upward from its standard vertical position.

Now let it be assumed that an output voltage from the upper tape edge position sensor 36 is expressed as $e_1$, and an output voltage from the lower tape edge position sensor 37 is denoted by $e_2$. Where the magnetic tape 12 retains the standard vertical position, then there results $e_1 = e_2$. Where, as seen from FIG. 3, the running magnetic tape 12 is displaced upward from its standard vertical position, then there results $e_1 < e_2$. Conversely where the running magnetic tape 12 is displaced downward (not shown), then $e_1 > e_2$ takes place. An output voltage level can be processed by an electrical circuit shown in FIG. 4.

Figure 4:
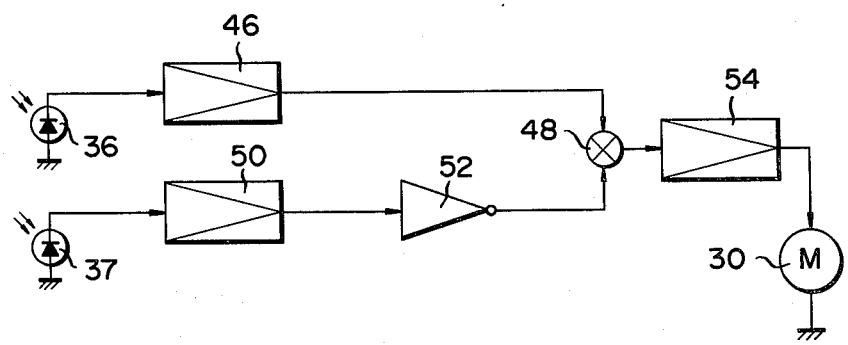
FIG. 4 shows an electrical circuit diagram for controlling an output from a tape edge position sensor.

Description is now given of the operation of the electrical circuit of FIG. 4. An output voltage $e_1$ from the upper tape edge position sensor 36 is supplied to a voltage amplifier 46. The amplified voltage is conducted to one of the input terminals of a mixer 48. An output voltage $e_2$ from the lower tape edge position sensor 37 is amplified by a voltage amplifier 50. Then the amplified voltage is supplied to the other input terminal of the mixer 48 after the polarity of the amplified voltage is reversed by an inverter 52. The amplified output voltage from the lower tape edge position sensor 37 is mixed with an output from the voltage amplifier 46. An output from the mixer 48 has its amperage amplified by a current amplifier 54, and drives the reversible motor 30 for the tape edge position-compensating post 16.

Figure 5:
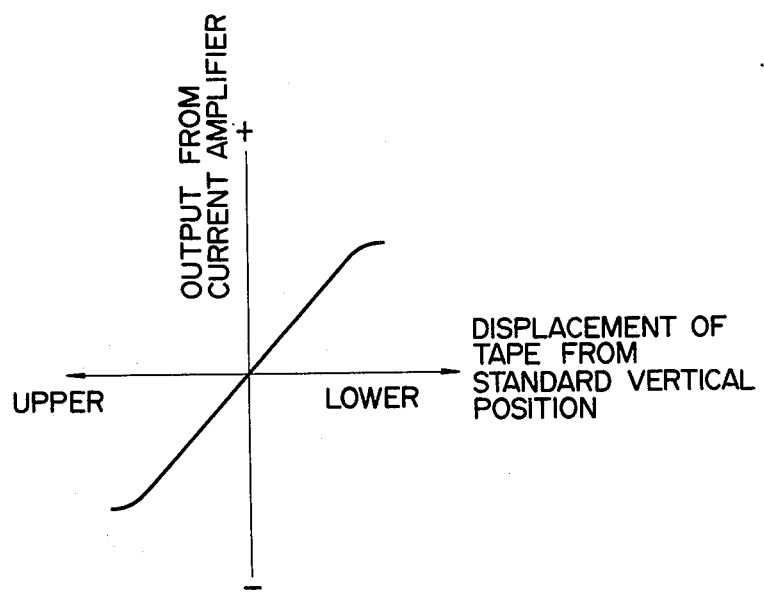
FIG. 5 shows the relationship between the voltage of an output from a current amplifier and the vertical position of a magnetic tape.

FIG. 5 shows the relationship between the level of an output from the current amplifier 54 and the vertical position of the magnetic tape 12. Output voltages $e_1$, $e_2$ from the upper and lower tape edge position sensors 36, 37 are at zero volts, while the magnetic tape 12 is running with the standard vertical position. At this time, an output from the current amplifier 54 also is zero volt volts. Where the magnetic tape 12 is displaced, for example, upward, then an output voltage $e_1$ from the upper tape edge position sensor 36 decreases. On the other hand, an output voltage $e_2$ from the lower tape edge position sensor 37 increases. However, the output voltage $e_2$ has its polarity reversed to the negative side by the inverter 52. As a result, an output voltage $e_1+e_2$ from the mixer 48 is changed to the negative side. The current amplifier 54 amplifies an output current from the mixer 48. The amplifier output current from the amplifier 54 drives the D.C. reversible motor 30 in such direction as causes the tape edge position-compensating post 16 to press the magnetic tape 12 downward. Accordingly, an output from the current amplifier 54 constitutes a negative feedback servo loop which remains stable in a position near the zero point of FIG. 5. The extent to which the vertical position of the magnetic tape 12 is to be adjusted to counterbalance its vertical displacement from the standard position is determined by the magnitude of the servo gain. The larger the servo gain, the smaller the extent to which the vertical position of the magnetic tape 12 is to be adjusted.

With the automatic magnetic tape-tracking apparatus 10 of FIG. 1, an assembly of the upper tape edge position sensor 36 and corresponding light-emitting diode 44 which acts as a member of a tape edge-detecting means 35 is set at the same level as the upper edge of the magnetic tape 12. An assembly of the lower tape edge position sensor 37 and corresponding light-emitting diode 45 which also acts as a member of a tape edge-detecting means 35 is positioned at the same level as the lower edge of the magnetic tape 12. However, it is possible to arrange an assembly of a tape edge position sensor and corresponding light-emitting diode at the same level as the upper or lower edge of the magnetic tape 12. Where, however, the assemblies are respectively set, as shown in FIG. 1, at the same level as the upper and lower edges of the magnetic tape 12, and the tape edge position sensors are designed to indicate the same light-receiving area when the running magnetic tape 12 maintains its standard vertical position, then the drive of the reversible motor 30 can be easily controlled.

The tape edge position-compensating means 17 comprises the tape edge position-compensating post 16 which is rotated about the pivotal shaft 24 by means of the cam 28 fixed to the motor shaft 31. However, this arrangement need not be exclusively applied. Various modifications of the arrangement can obviously be carried out.

As described above, a magnetic tape-automatic tracking apparatus embodying this invention comprises a tape edge position-compensating means which applies a tensile force to a magnetic tape in contact therewith, and a tape edge position-detecting means for detecting the upper or lower edge of the magnetic tape, thereby detecting the vertical position of the magnetic tape. Any displacement of the magnetic tape from its standard vertical position is determined from detected data. The mode in which the tape edge position-compensating means is pressed against the magnetic tape is changed in accordance with the extent of the displacement, thereby controlling the magnitude of a tensile force which the tape edge position-compensating means applies to the magnetic tape. In other words, the magnitude of a tensile force vertically applied by the tape edge position-compensating means to the magnetic tape becomes uneven in the vertical direction thereof due to changes in the mode in which the tape edge position-compensating means contacts the magnetic tape. As a result, the magnetic tape vertically slides in the direction in which a smaller tensile force is applied by the tape edge position-compensating means to the magnetic tape, namely, in that direction in which the magnetic tape coincides with its standard vertical position. As a result, the running magnetic tape can retain a standard vertical position, thereby ensuring the automatic tracking of the magnetic tape. The magnetic tape-automatic tracking method of this invention saves the upper and lower edges of the magnetic tape from stresses and consequently enables the magnetic tape to sustain the standard vertical position during its run without damage of the upper and lower edges.

Further, the process of detecting the positions of the upper and lower edges of the magnetic tape in the form of an electrical signal as is carried out in this invention is advantageous in adjusting the vertical position of the magnetic tape during its run to the standard vertical position.

The magnetic tape-automatic tracking apparatus of this invention does not apply mechanical stresses to the upper and lower edges of the magnetic tape, nor is it complicated in arrangement. It is further preferred that the tape edge position-compensating means should comprise a tape edge position-compensating post, and this post should be urged by an urging means for contact with the magnetic tape as well as with a cam fitted to the shaft of the reversible motor. The above-mentioned arrangement has the advantage that where the reversible motor is rotated in accordance with the extent to which the magnetic tape is displaced from its standard vertical position, then a tensile force applied by the tape edge position-compensating post to the magnetic tape can be controlled easily and accurately.

What we claim is:

1. A method for automatically tracking a magnetic tape running against a magnetic head having a vertical assembly of vertically extending head gaps formed therein, said magnetic head being fixed during running of the tape thereagainst which comprises the steps of:

detecting the vertical position of a magnetic tape during its run by a means for detecting, at a position aligned vertically with the vertical axis of the vertical assembly of vertically extending head gaps formed in the magnetic head, at least one of the positions of the upper and lower edges of the magnetic tape, and generating data corresponding to the detected position;

determining any displacement of the magnetic tape from its standard vertical position from detected data; and varying the mode in which a tape edge position-compensating means for applying a tensile force to the magnetic tape by contact with the upper or lower edge portion of the tape in the sideward direction of the tape is pressed against the magnetic tape in order to control the tensile force applied by the tape edge position-compensating means to the magnetic tape to thereby control the vertical position of the magnetic tape relative to said magnetic head, thereby enabling the running magnetic tape to maintain its standard vertical position.

2. The method according to claim 1, wherein:

the detecting step comprises detecting the positions of both the upper and lower edges of the magnetic tape and generating data corresponding to the detected positions in the form of respective electrical signals, the step of determining any displacement of the magnetic tape from its standard vertical position comprises comparing said respective electrical signals, and the step of varying the mode in which said tape edge position-compensating means presses against the magnetic tape comprises rotating the tape edge position-compensating means in accordance with the detected extent of the displacement of the magnetic tape from its standard vertical position which is a function of the results of comparison of said signals.

3. In a magnetic tape recording and/or reproducing apparatus including a magnetic head having a vertical assembly of vertically extending head gaps formed therein, said magnetic head being fixed during running of the tape against said magnetic head, an apparatus for automatically tracking a magnetic tape, which comprises:
- a tape edge position-compensating means for applying a tensile force to the magnetic tape in contact with the upper or lower edge portions of the tape in the sideward direction of the tape;
- a tape edge position-detecting means which detects, at a position aligned vertically with the vertical axis of the vertical assembly of vertically extending head gaps formed in the magnetic head, at least one of the positions of the upper and lower edges of the magnetic tape;
- means coupled to said detecting means for determining any displacement of the magnetic tape from its standard vertical position; and
- means coupled to said determining means for varying the mode in which the tape edge position-compensating means is pressed in said sideward direction against the magnetic tape edge portions in order to control the tensile force applied by the tape edge position-compensating means to the magnetic tape to thereby control the vertical position of the magnetic tape relative to said magnetic head, thereby enabling the running magnetic tape to maintain its standard vertical position.

4. The apparatus according to claim 3, wherein: the tape edge position-compensating means includes:
- an urging means;
- a rotatable, pivotally mounted tape edge position-compensating post whose pivot point is substantially on the center line of the running tape, and which is urged by the urging means for abutment against a side edge portion of the magnetic tape to apply a substantially uniform tensile force across the magnetic tape; and
- said varying means includes a drive means coupled to said determining means for rotating the tape edge position-compensating post about said pivot point thereof in accordance with the extent to which the magnetic tape is displaced from its standard vertical position, thereby applying a substantially uniform tensile force to the magnetic tape.

5. The apparatus according to claim 4, wherein the drive means includes a reversible motor which is rotated in accordance with the extent to which the magnetic tape is displaced from its standard vertical position; and a cam which is fitted to a motor shaft of the reversible motor, and toward the peripheral wall of which the tape edge position-compensating post is urged by the urging means.

6. The apparatus according to any one of claims 3 to 5, wherein the tape edge position-detecting means includes at least one tape edge position sensor which is aligned with the axis of the vertical assembly of vertically extending head gaps formed in the magnetic head, and is partly covered by the edge portion of the running magnetic tape; and at least one light-emitting diode for sending forth a light to the tape edge position sensor.

7. The apparatus according to claim 6, wherein the tape edge position-detecting means includes upper and lower tape edge position sensors each having light receiving areas and a pair of light-emitting diodes respectively associated with a tape edge position sensor; said tape edge position sensors being located such that while the running magnetic tape maintains its standard vertical position, the lower half of the light receiving area of the upper tape edge position sensor is covered by the upper edge of the magnetic tape, and the upper half of the light receiving area of the lower tape edge position sensor is covered by the lower edge of the magnetic tape.

8. The apparatus according to claim 7, wherein an output from one of the tape edge position sensors is supplied to a mixer through an inverter, and an output from the other of the tape edge position sensors is supplied to the mixer not through the inverter; and the mode in which the tape edge position-compensating post abuts against the magnetic tape is changed in accordance with the magnitude of an output from the mixer.

9. The method according to claim 1 or 2, wherein said detecting means comprises an elongated urging means having a longitudinal axis which is aligned substantially in parallel with the vertical axis of the vertical assembly of vertically extending head gaps of said magnetic head, said elongated urging means being arranged to contact the edge portions of the magnetic tape without contacting the edge portions in a substantially horizontal direction, said elongated urging means being rotated by rotating said longitudinal axis in a direction perpendicular to the face of the magnetic tape in a direction toward or away from the face of the magnetic tape to thereby apply a tensile force to the upper or lower edge portions of the tape in the sideward direction of the tape.

10. The apparatus according to any one of claims 3–5, wherein said tape edge position-compensating means is located closely adjacent to said vertical axis of said vertical assembly of vertically extending head gaps of said magnetic head.

* * * * *

UNITED STATES PATENT AND TRADEMARK OFFICE
CERTIFICATE OF CORRECTION

PATENT NO. : 4,363,042

DATED : December 7, 1982

INVENTOR(S) : Kenji KIMURA et al

It is certified that error appears in the above-identified patent and that said Letters Patent is hereby corrected as shown below:

COLUMN 2, line 8, after "which detects" insert --, at the position--;

COLUMN 4, line 62, after "also is zero" delete "volt".

Signed and Sealed this

Fourteenth Day of June 1983

[SEAL]

Attest:

DONALD J. QUIGG

Attesting Officer

Acting Commissioner of Patents and Trademarks